Patented Mar. 27, 1923.

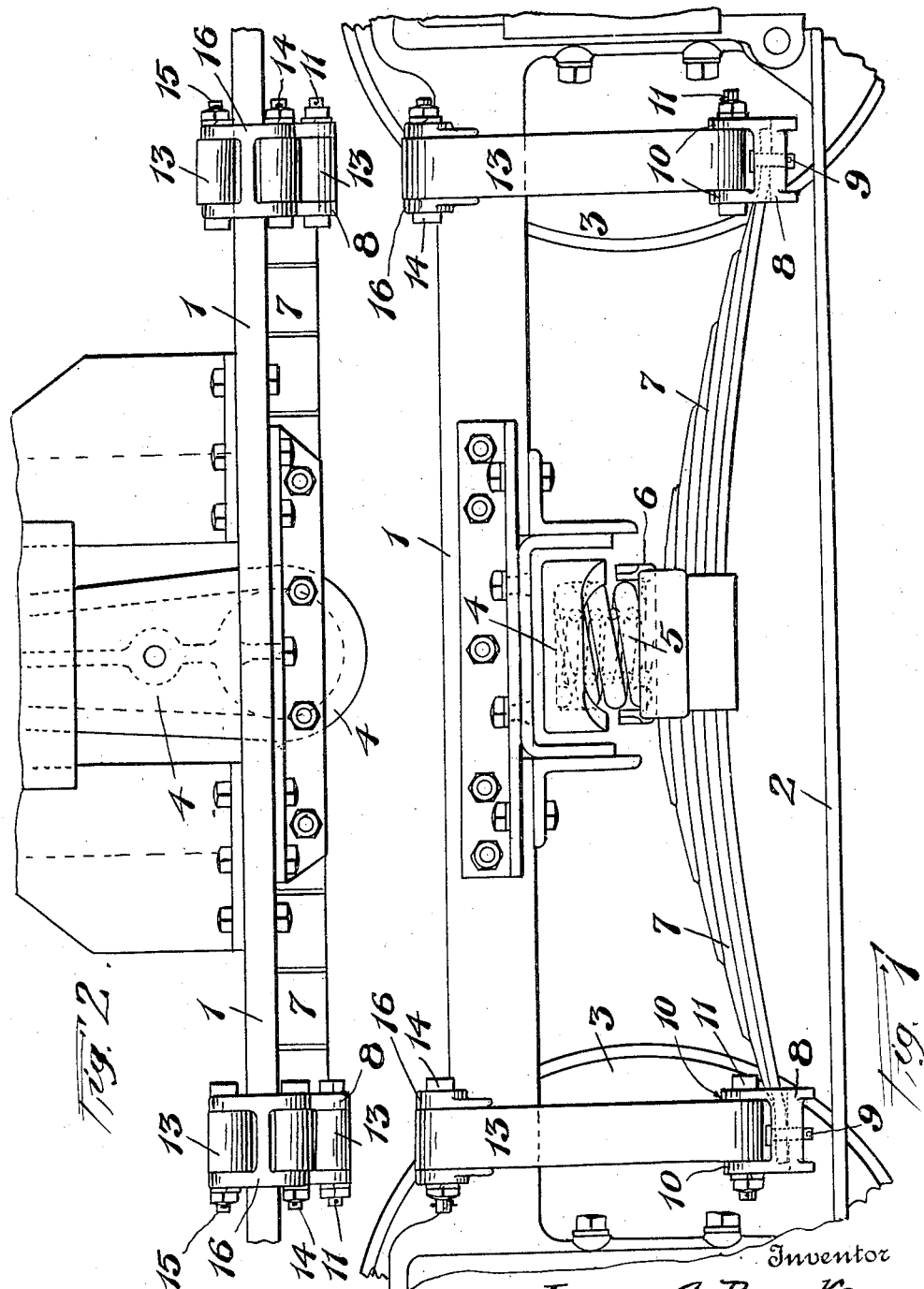

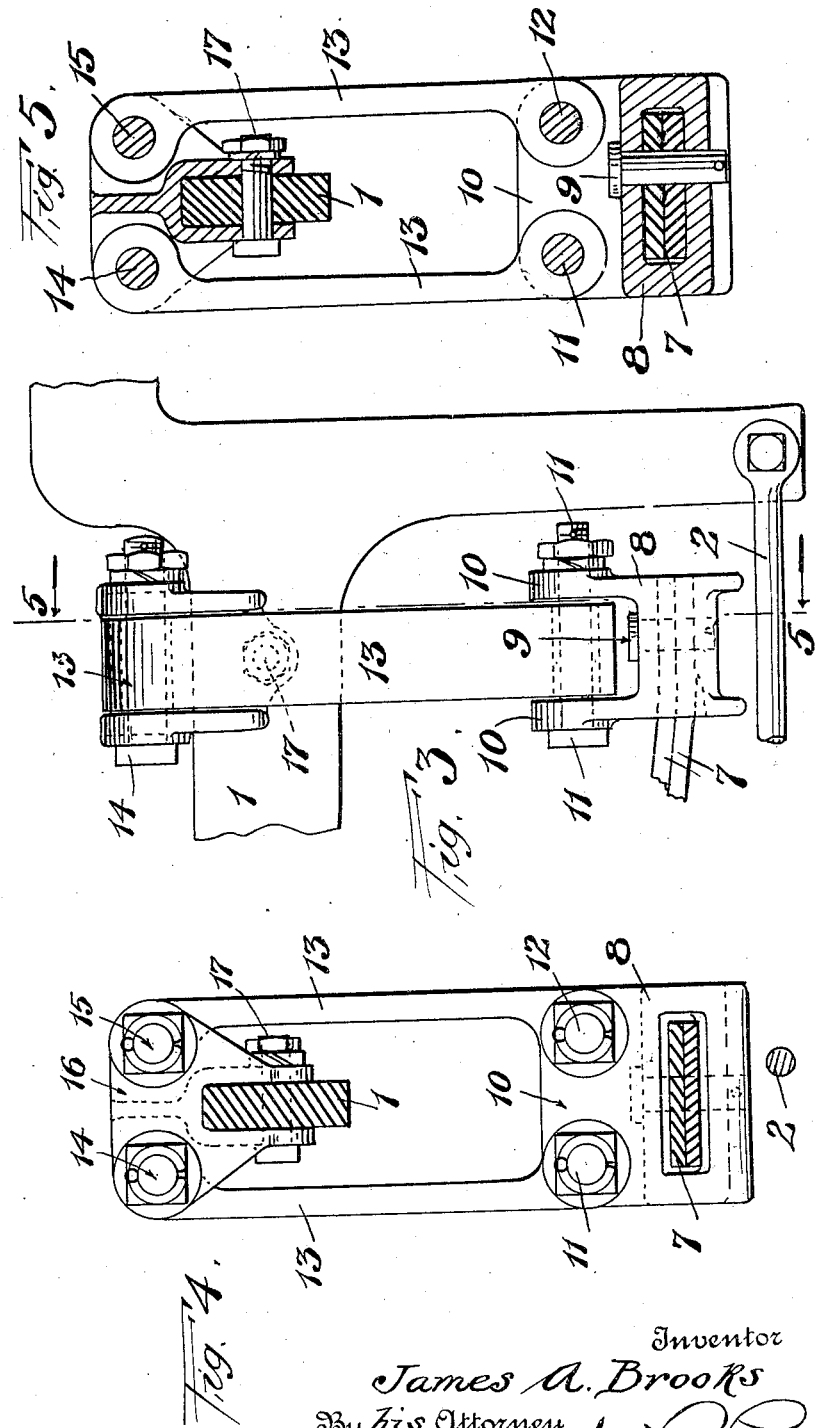

1,449,935

UNITED STATES PATENT OFFICE.

JAMES A. BROOKS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR TRUCK.

Application filed December 22, 1922. Serial No. 608,401.

*To all whom it may concern:*

Be it known that I, JAMES A. BROOKS, a citizen of the United States, and a resident of the city and county of Philadelphia and State of Pennsylvania, have invented a certain new and useful Improvement in Car Trucks, of which the following is a specification.

This invention relates to car trucks and has for its object to provide means for preventing the undesirable lateral movement of the car body on an uneven track. This is generally caused by twisting movement of the leaf springs on which the bolster is supported.

A further object of this invention is to provide means for suspending the leaf springs of a car truck to permit the same to have a slight lateral or swinging movement, retaining the springs substantially horizontal during such movement and avoiding undesirable twisting strains on the ends of said springs which is the case when such springs are held rigid.

With these objects and other objects which may hereinafter appear, in view, I have devised the particular arrangement of parts hereinafter set forth and more particularly pointed out in the claims appended hereto.

Reference is to be had to the accompanying drawing forming a part hereof in which—

Figure 1 is a side elevation of a portion of a truck showing my improved spring suspension.

Figure 2 is a plan view of the same.

Figure 3 is a side elevation of one of the spring suspending links.

Figure 4 is an end view of the same, and

Figure 5 is a sectional view on the line 5—5 of Figure 3 looking in the direction of the arrows.

In the preferred embodiment of my invention as shown in the accompanying drawing, 1 indicates one of the upper side frame members of the truck and 2 indicates a lower side member of the truck frame.

At 3 are shown the wheels and at 4 a portion of the bolster which is carried upon a coil spring 5 supported on a seat 6 carried on top of a semi-elliptic spring 7.

This construction is found at each side of the truck and I have described the same in connection with one side. The ends of the semi-elliptic springs are supported in brackets 8 and to retain the ends of the spring 7 therein, a pin 9 is provided which passes through the end of the spring and through each bracket. Each of the brackets 8 is provided with upwardly extending ears 10, in which is pivoted as at 11 and 12, a pair of parallel links or hangers 13. The upper ends of each of these links are pivoted as at 14 and 15 in a bracket 16 which is arranged to straddle the frame 1.

A bolt 17 extends through each bracket 16 and through the frame and secures said bracket in position. Both ends of the spring 7 are similarly supported and it will be seen that through the construction above described, the spring is at all times held horizontal and any transverse movement that said spring may have will not cause the ends of the spring to be twisted or distorted but will permit said spring to move laterally and retain the same in a horizontal and even position during such swinging movement.

From the foregoing, it is obvious that my invention is not to be restricted to the exact embodiment shown but is broad enough to cover all structures coming within the scope of the annexed claims.

What I claim is:—

1. In a car truck, a truck frame, a car-body supporting leaf spring, brackets for supporting the ends of said leaf spring, brackets secured to the frame, and links having their ends pivotally secured to said spring-supporting brackets and pivotally secured to the frame brackets.

2. In a car truck, a truck frame, paired links pivotally secured thereto and depending therefrom, brackets pivotally secured to the lower ends of said links and a leaf spring having its ends carried by said brackets.

3. In a car truck, a truck frame, a bracket adapted to straddle said frame, a pair of links pivotally secured in said bracket and depending downwardly on opposite sides of said frame, a bracket pivotally secured to the lower ends of said links and a leaf spring having its end carried by said bracket.

4. In a car truck, a truck frame, a semi-elliptic spring mounted therein, means for supporting the ends of said spring, said supporting means consisting of a pair of parallel links having their upper ends pivotally secured to the frame and their lower ends pivotally connected to the end of said leaf spring.

5. In a car truck, a truck frame, semi-elliptic spring mounted therein, a bracket secured on said frame, a link pivoted to said bracket and depending therefrom on one side of the frame, another link pivoted to said bracket and depending therefrom on the opposite side of the frame and a bracket receiving the end of said semi-elliptic spring and pivotally connected to both of said links at their lower ends.

6. In a car truck, a truck frame, a link pivotally connected to said frame and depending therefrom, a leaf spring, a bracket receiving the end of said leaf spring, a pin extending through said bracket and through the spring and a pivotal connection between said bracket and said link.

Signed at the city and county of Philadelphia, State of Pennsylvania, this 8th day of December, 1922.

JAMES A. BROOKS.